US010430622B2

(12) United States Patent
Nikitin et al.

(10) Patent No.: US 10,430,622 B2
(45) Date of Patent: Oct. 1, 2019

(54) RFID TAG WITH RECONFIGURABLE PROPERTIES AND/OR RECONFIGURING CAPABILITY

(71) Applicant: INTERMEC, INC., Lynnwood, WA (US)

(72) Inventors: Pavel Nikitin, Seattle, WA (US); Rene Martinez, Seattle, WA (US); Stephen J. Kelly, Marion, IA (US); Shashidhar Ramamurthy, Seattle, WA (US)

(73) Assignee: INTERMEC, INC., Lynnwood, WA (US)

( * ) Notice: Subject to any disclaimer, the term of this patent is extended or adjusted under 35 U.S.C. 154(b) by 0 days.

(21) Appl. No.: 15/637,520

(22) Filed: Jun. 29, 2017

(65) Prior Publication Data

US 2019/0005283 A1    Jan. 3, 2019

(51) Int. Cl.
*G06K 7/10* (2006.01)
*G06K 19/077* (2006.01)
*G06K 19/07* (2006.01)

(52) U.S. Cl.
CPC ..... *G06K 7/10227* (2013.01); *G06K 7/10158* (2013.01); *G06K 7/10316* (2013.01); *G06K 19/0709* (2013.01); *G06K 19/0716* (2013.01); *G06K 19/07773* (2013.01)

(58) Field of Classification Search
CPC ........... G06K 7/10227; G06K 7/10158; G06K 7/10316; G06K 19/0709; G06K 19/07773
USPC .................................................. 235/451, 492
See application file for complete search history.

(56) References Cited

U.S. PATENT DOCUMENTS

| | | |
|---|---|---|
| 5,649,295 A | 7/1997 | Shober et al. |
| 6,243,013 B1 | 6/2001 | Duan et al. |
| 6,265,962 B1 | 7/2001 | Black et al. |
| 6,456,668 B1 | 9/2002 | MacLellan et al. |
| 6,802,659 B2 | 10/2004 | Cremon et al. |
| 7,232,069 B1 | 6/2007 | White |
| 7,304,579 B2 | 12/2007 | Diorio et al. |
| 7,525,438 B2 | 4/2009 | Hyde et al. |
| 7,952,464 B2 | 5/2011 | Nikitin et al. |
| 8,207,828 B2 | 6/2012 | Hanebeck |
| 8,253,539 B2 | 8/2012 | Scaramozzino |
| 8,258,920 B2 | 9/2012 | Crucs |
| 8,416,079 B2 | 4/2013 | Roesner |
| 8,564,412 B2 | 10/2013 | Nikitin et al. |
| 8,610,539 B2 * | 12/2013 | Solomon .................. G05B 1/01 340/10.1 |

(Continued)

OTHER PUBLICATIONS

Jan. 8, 2018 Notice of Allowance issued in U.S. Appl. No. 15/343,553.

(Continued)

*Primary Examiner* — Paultep Savusdiphol
(74) *Attorney, Agent, or Firm* — Oliff PLC; R. Brian Drozd

(57) ABSTRACT

A method for reconfiguring an RFID tag or RFID reader is disclosed. The method may include receiving a wireless signal from an RFID reader; processing, by an RFID circuit, the wireless signal received from the antenna; determining if a first sensor or switch that is connected to the RFID circuit is engaged or activated; outputting a first signal to the RFID circuit when the first sensor or switch is engaged or activated; and changing by the RFID circuit, at least one operating parameter of the RFID tag when the RFID circuit receives the first signal.

14 Claims, 12 Drawing Sheets

(56) References Cited

U.S. PATENT DOCUMENTS

| | | | |
|---|---|---|---|
| 8,947,214 B2* | 2/2015 | Solomon | G05B 1/01 340/286.11 |
| 9,055,798 B2 | 6/2015 | Scicluna | |
| 9,082,057 B2 | 7/2015 | McGregor | |
| 9,165,170 B1 | 10/2015 | Gutnik et al. | |
| 9,317,729 B2 | 4/2016 | Krusor et al. | |
| 9,514,402 B1 | 12/2016 | Kim et al. | |
| 2004/0263319 A1 | 12/2004 | Huomo | |
| 2005/0052279 A1 | 3/2005 | Bridgelall | |
| 2005/0237198 A1* | 10/2005 | Waldner | G06K 19/0707 340/572.7 |
| 2006/0133175 A1 | 6/2006 | Gutnik et al. | |
| 2006/0163370 A1 | 7/2006 | Diorio et al. | |
| 2007/0194914 A1* | 8/2007 | Gates | G08B 13/08 340/541 |
| 2007/0200681 A1* | 8/2007 | Colby | G06K 19/025 340/10.51 |
| 2008/0303633 A1 | 12/2008 | Cheng et al. | |
| 2009/0015407 A1 | 1/2009 | Tuttle | |
| 2009/0094410 A1 | 4/2009 | Kari et al. | |
| 2010/0123581 A1* | 5/2010 | Hatfield | G06K 19/0716 340/572.3 |
| 2011/0140537 A1 | 6/2011 | Takei | |
| 2011/0205026 A1 | 8/2011 | Bateman | |
| 2011/0285511 A1* | 11/2011 | Maguire | G06K 19/0724 340/10.1 |
| 2012/0083205 A1 | 4/2012 | Marcu et al. | |
| 2012/0211560 A1* | 8/2012 | Su | G06Q 10/10 235/380 |
| 2013/0181815 A1 | 7/2013 | Wang et al. | |
| 2013/0201000 A1* | 8/2013 | Solomon | G05B 1/01 340/5.83 |
| 2013/0241779 A1 | 9/2013 | Korva | |
| 2014/0001876 A1 | 1/2014 | Fujiwara et al. | |
| 2014/0016719 A1 | 1/2014 | Manku | |
| 2014/0033289 A1* | 1/2014 | Solomon | G05B 1/01 726/7 |
| 2014/0045425 A1 | 2/2014 | Roh et al. | |
| 2014/0176307 A1 | 6/2014 | Forster | |
| 2015/0379459 A1* | 12/2015 | Russell | G06Q 10/087 235/380 |
| 2016/0364642 A1 | 12/2016 | Viala et al. | |

OTHER PUBLICATIONS

Nikitin et al; "UHF RFID Tag Characterization: Overview and State-of-the-Art" AMTA Conference, Seattle, Washington; Oct. 2012; 6 pp.

Nikitin et al; "Effect of Gen2 Protocol Parameters on RFID Tag Performance;" IEEE RFID Conference, Orlando, Florida; Apr. 2009; 6 pp.

Pillai et al; "A Technique for Simultaneous Multiple Tag Identification;" IEEE Workshop on Automatic Identification Advanced Technologies; Oct. 2005; pp. 35-38.

Nikitin et al; "Differential RCS of RFID tag;" Electronics Letters; Apr. 12, 2007; vol. 43; No. 8; 2 pp.

Nikitin et al; "Power Reflection Coefficient Analysis for Complex Impedances in RFID Tag Design;" IEEE Transactions on Microwave Theory and Techniques; Sep. 9, 2005; vol. 53; No. 9; pp. 2721-2725.

D'Orazio; "Pitt researchers' NFC and RFID cards feature a touch-sensitive on/off switch;" The Verge; Feb. 19, 2012; retreived from http://www.theverge.com/2012/2/19/2809205/nfc-rfid-credit-card-on-off-switch.

"UCODE;" May 21, 2015; retreived from http://www.nxp.com/products/identification-and-security/smart-label-and-tag-ics/ucode:MC_50483.

U.S. Appl. No. 15/343,553, filed Nov. 4, 2016 in the name of Nikitin et al.

Jun. 15, 2017 Office Action issued in U.S. Appl. No. 15/343,553.

U.S. Appl. No. 15/622,839, filed Jun. 14, 2017 in the name of Nikitin et al.

Oct. 4, 2018 Office Action issued in U.S. Appl. No. 15/622,839.

Oct. 25, 2018 Search Report issued in European Patent Application No. 18177629.5.

Mar. 21, 2019 Office Action issued in U.S. Appl. No. 15/622,839.

\* cited by examiner

RFID SYSTEM

RFID TAG

*RFID TAG IC COMPONENTS*

*SIGNAL PATH DURING R→T*

*SIGNAL PATH DURING T→R*

RFID TAG WITH RECONFIGURABLE PROPERTIES AND/OR RECONFIGURING CAPABILITY

BACKGROUND

Radio Frequency Identification ("RFID") tags are used for many purposes, including article control in retail stores and warehouses, electronic toll collection and tracking of freight containers. In many cases, the RFID tag is powered only by the electromagnetic energy from the radio signal sent by an interrogation device or "tag reader." Thus, when the tag is not being read, it is not possible for the tag electronics to perform any functions unless the tag is also battery powered. Battery power is not an option in many cases for reasons such as cost, size and reliability.

RFID tags may have non-volatile memory for storage of information that the user or the tag issuing entity may need to change during the tag's lifetime. Changing or writing data to the non-volatile memory such as an EEPROM requires that the tag be powered. One application for the use of non-volatile memory in an RFID tag is to record events in the tag's environment, such as temperature, shock and vibration, to record the environment to which the object that the tag is associated with was subjected.

Passive tags are always "on" in that they respond any time when interrogated by RFID reader and are simple devices that only output information that is resident in memory, such as saved temperature data, tag ID number, etc. Also, tags only can output data using a single antenna, at a single frequency using only one protocol. In this regard, the tags are very limited in what can be outputted and the manner in which the data can be outputted.

For many applications, for example where tags are transported or carried by individuals through high traffic areas, (such as automotive tolling plazas, or security entrance points), there is currently no way to have a tag whose properties—protocol, or state, or ability to respond to the reader—can be changed externally by the tag owner, without using an RFID reader. Also, there is currently no way to change RFID reader settings remotely, using an RFID tag.

SUMMARY

A method for reconfiguring an RFID tag or RFID reader is disclosed. The method may include receiving a wireless signal from an RFID reader; processing, by an RFID circuit, the wireless signal received from the antenna; determining if a first sensor or switch that is connected to the RFID circuit is engaged or activated; outputting a first signal to the RFID circuit when the first sensor or switch is engaged or activated; and changing by the RFID circuit, at least one operating parameter of the RFID tag when the RFID circuit receives the first signal.

BRIEF DESCRIPTION OF THE DRAWINGS

Examples of a self-steering antenna device are illustrated in the figures. The examples and figures are illustrative rather than limiting.

DETAILED DESCRIPTION OF THE EMBODIMENTS

Figure 1:
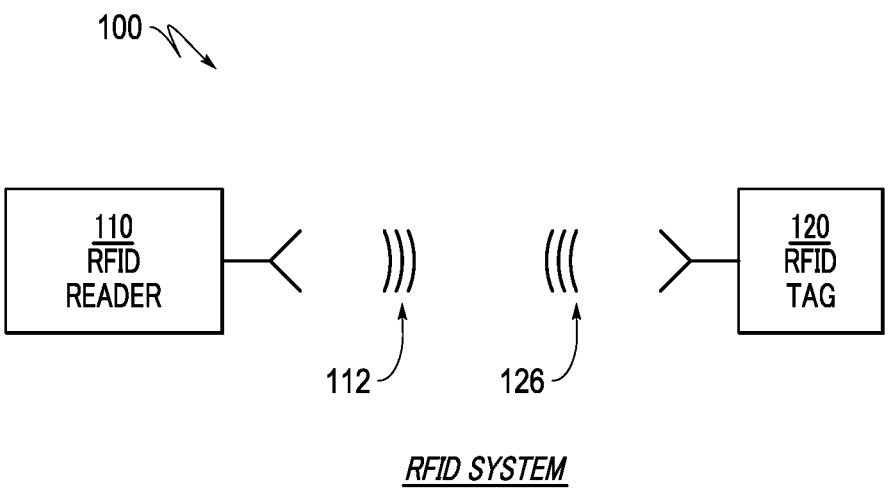
FIG. 1 is a block diagram of components of an RFID system according to embodiments.

Described below are example configurations of the present invention, any of which configuration can be used alone or in any combination.

Overview

Passive RFID tags typically consist of an integrated circuit ("IC") and an antenna. An IC is a low power device, powered by radio frequency ("RF") energy harvested from the reader signal. Passive tags are always "on" in that they respond any time when interrogated by radio frequency identification ("RFID") reader. Existing tags use ICs which are operating using one particular data protocol format (selected at the time of IC configuration stage at the manufacturing).

For many applications, for example where tags are transported or carried by individuals through high traffic areas, (such as automotive tolling plazas, or security entrance points), it is desirable to have a tag whose properties (e.g., protocol, state, or ability to respond to the reader, etc.) can be changed externally by the tag owner, without using an RFID reader.

It is also sometimes desirable to change RFID reader settings remotely, using an RFID tag.

The present application according to various embodiments, address these issues.

Generally speaking, the present application may relate to an RFID tag that includes an integrated circuit (IC) with external switch(es) or sensor(s) connected to the RFID tag. By engaging (e.g. touching) the sensor or the switch attached to the RFID tag, one can change or toggle the tag protocol, state, and/or status (on/off) of the RFID tag so that the RFID tag is placed in different modes to operate in a different manner (e.g., operates with a different frequency) and/or transmits different information in some embodiments.

The RFID tag may start in one mode, but a particular application/environment may cause the mode to change to another mode. This mode change can be permanent or reversible depending upon the application need. For example, the activation of the switch, or array of switches could allow the IC to internally select a different protocol or externally select a different antenna (e.g. with different frequency band or gain characteristics).

Accordingly, this changes the protocol/state of the RFID tag and/or the parameters of RFID reader that reads this tag based upon the presence of an external input to the tag—not simply reporting the value of this external input (i.e. temperature, capacitance, tamper loop status, etc.) to the reader as U.S. Pat. Nos. 9,317,729 and 9,082,057, both of which are incorporated herein by reference.

Moreover, U.S. Pat. Nos. 7,952,464 and 8,416,079, both of which are incorporated herein by reference, teach how to build a multi-protocol/state tag but in a form of a combination of several different tags with antennas that can be selectively enabled or disabled via antenna switches, similar to U.S. Pat. No. 9,055,798, which is incorporated herein by reference, and which teaches how a tag can be enabled or disabled by physically putting it into an electromagnetic (EM) shielding wallet.

Various embodiments are discussed in more depth below in combination with the drawings.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1," if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
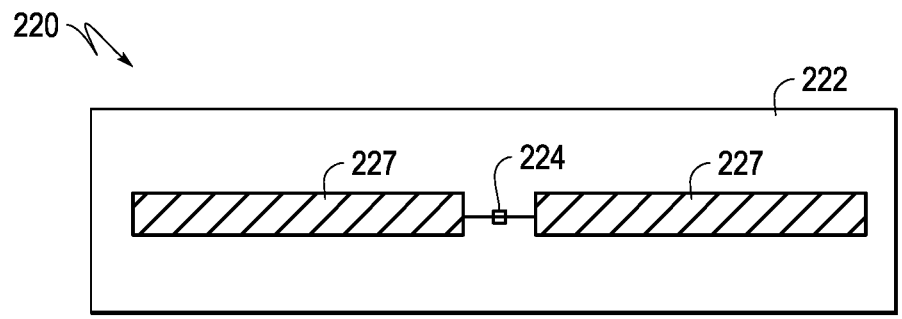
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which may be implemented as an integrated circuit (IC) 224. IC 224 is arranged on printed circuit board (PCB) 222.

Tag 220 also includes an antenna for exchanging wireless signals with its environment. The antenna may be flat (e.g., a microstrip) and attached to PCB 222. IC 224 is electrically coupled to the antenna via suitable antenna terminals (not shown in FIG. 2).

IC 224 is shown with a single antenna port, comprising two antenna terminals coupled to two antenna segments 227 which are shown here forming a dipole. Many other embodiments are possible using any number of ports, terminals, antennas, and/or segments of antennas.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on.

The components of the RFID system of FIG. 1 may communicate with each other in any number of modes. One such mode is called full duplex. Another such mode is called half-duplex, and is described below.

Figure 3:
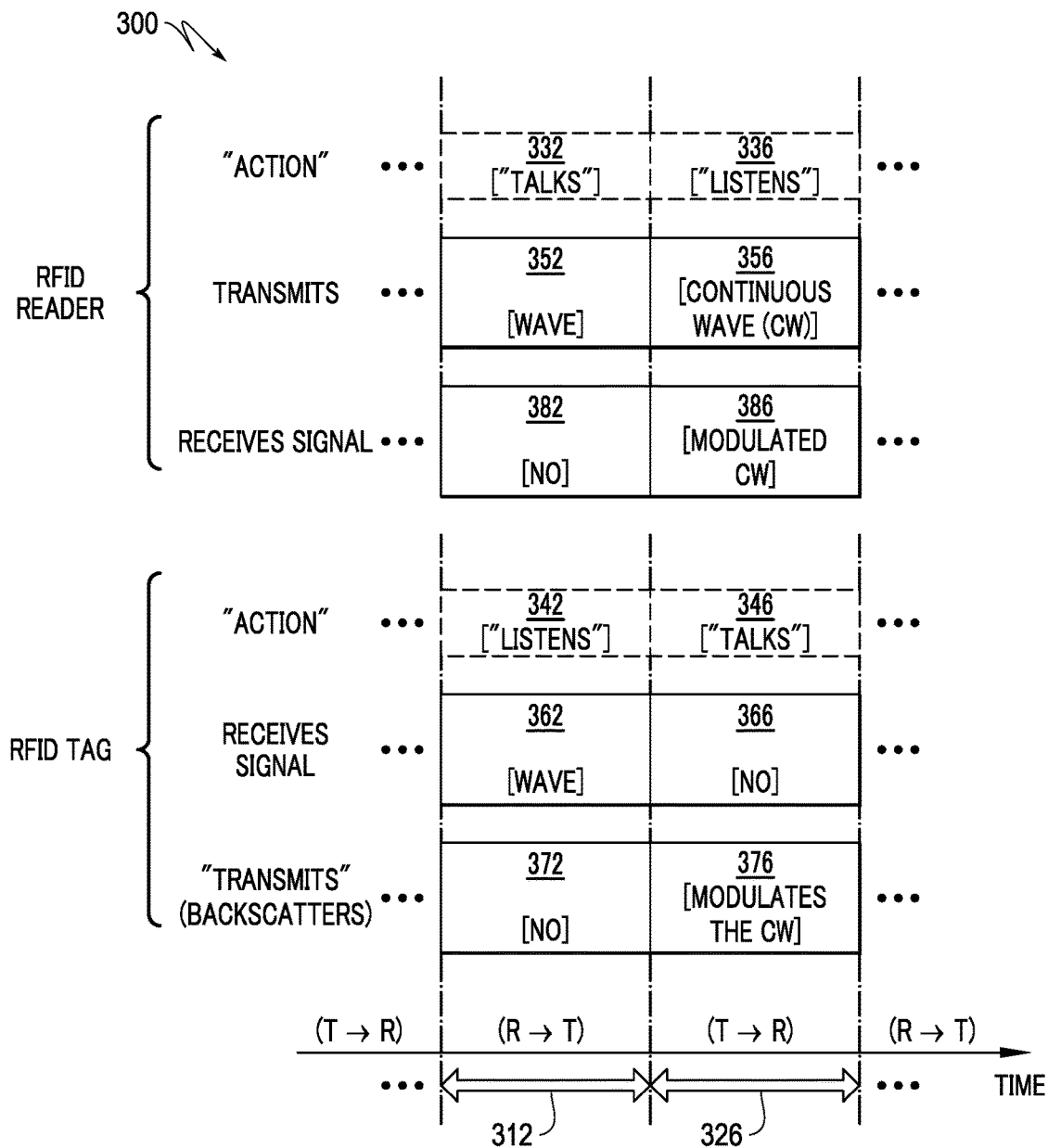
FIG. 3 is a section view showing how a bumped RFID tag chip can contact an antenna element in a tag.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
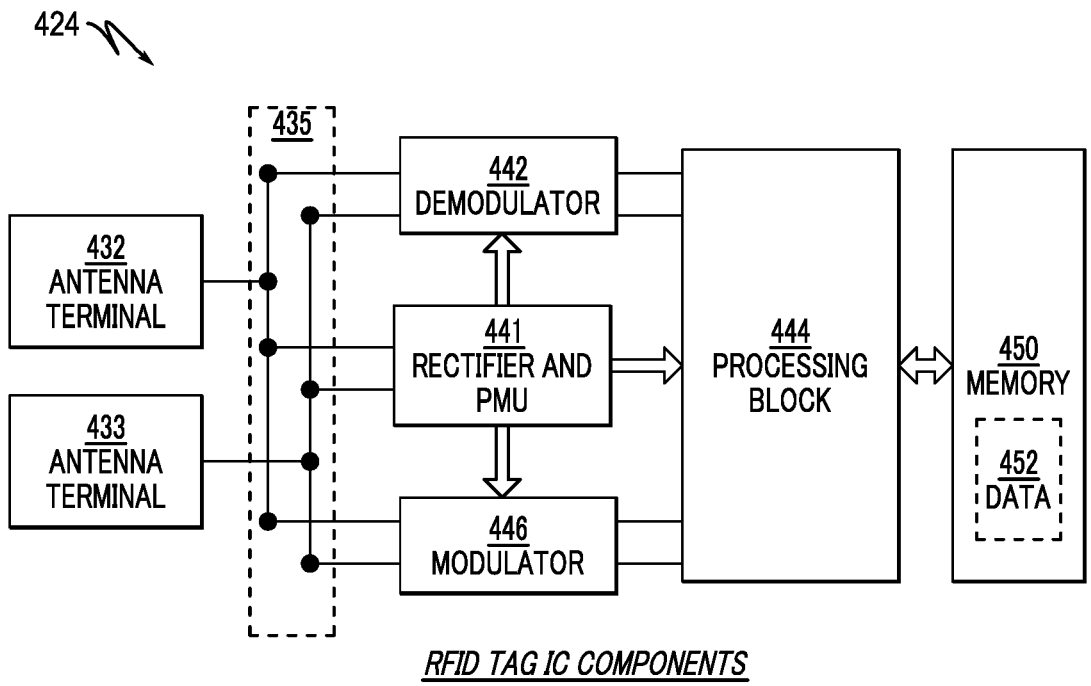
FIG. 4 is a block diagram showing detail of an RFID tag, according to embodiments.

FIG. 4 is a block diagram showing a detail of an RFID IC, such as the one shown in FIG. 2. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 shows two antenna terminals 432, 433, which are suitable for coupling to antenna segments such as segments 227 of RFID tag 220 of FIG. 2. When two antenna terminals form a signal path with an antenna they are often referred-to as an antenna port. Antenna terminals 432, 433 may be made in any suitable way, such as using pads and so on. In many embodiments more than two antenna terminals are used, especially when more than one antenna port or more than one antenna is used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Rectifier and PMU (Power Management Unit) 441. Rectifier and PMU 441 may be implemented in any way known in the art, for harvesting raw RF power received via antenna terminals 432, 433. In some embodiments, block 441 may include more than one rectifier.

In operation, an RF wave received via antenna terminals 432, 433 is received by Rectifier and PMU 441, which in turn generates power for the electrical circuits of IC 424. This is true for either or both reader-to-tag (R→T) and tag-to-reader (T→R) sessions, whether or not the received RF wave is modulated.

Circuit 424 additionally includes a demodulator 442. Demodulator 442 demodulates an RF signal received via antenna terminals 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna terminals 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R→T session and a T→R session. The different operations are described below, in this case with circuit 424 representing an IC of an RFID tag.

Figure 5A:
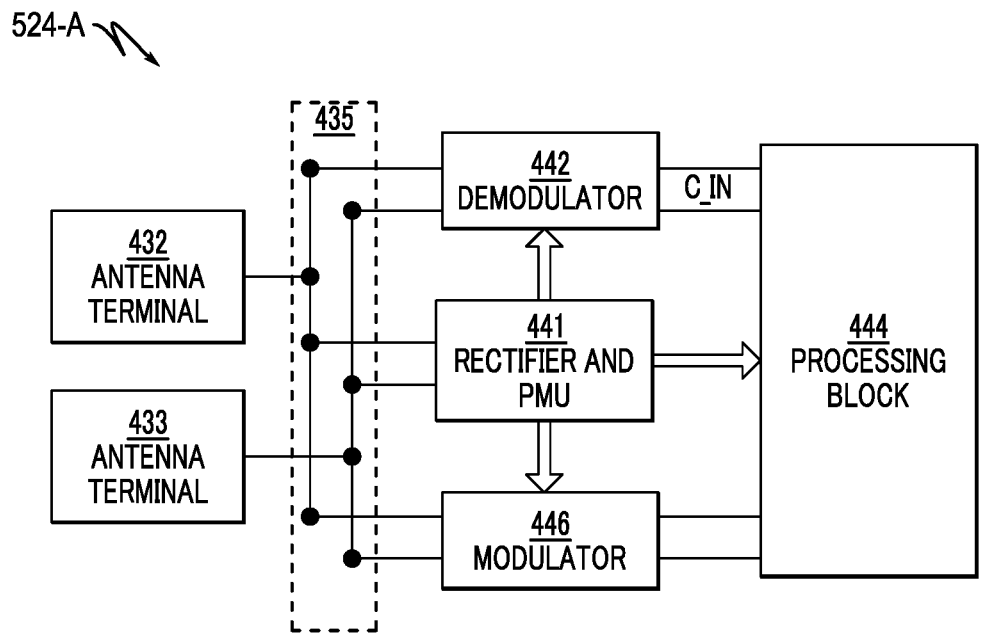
FIGS. 5A and 5B illustrate signal paths during tag-to-reader and reader-to-tag communications in the block diagram of FIG. 4, according to embodiments.

FIG. 5A shows version 524-A of components of circuit 424 of FIG. 4, further modified to emphasize a signal operation during a R→T session (receive mode of operation) during time interval 312 of FIG. 3. An RF wave is received from antenna terminals 432, 433, and then a signal is demodulated from demodulator 442, and then input to processing block 444 as C_IN. In one embodiment, C_IN may include a received stream of symbols.

Version 524-A shows as relatively obscured those components that do not play a part in processing a signal during a R→T session. Indeed, Rectifier and PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
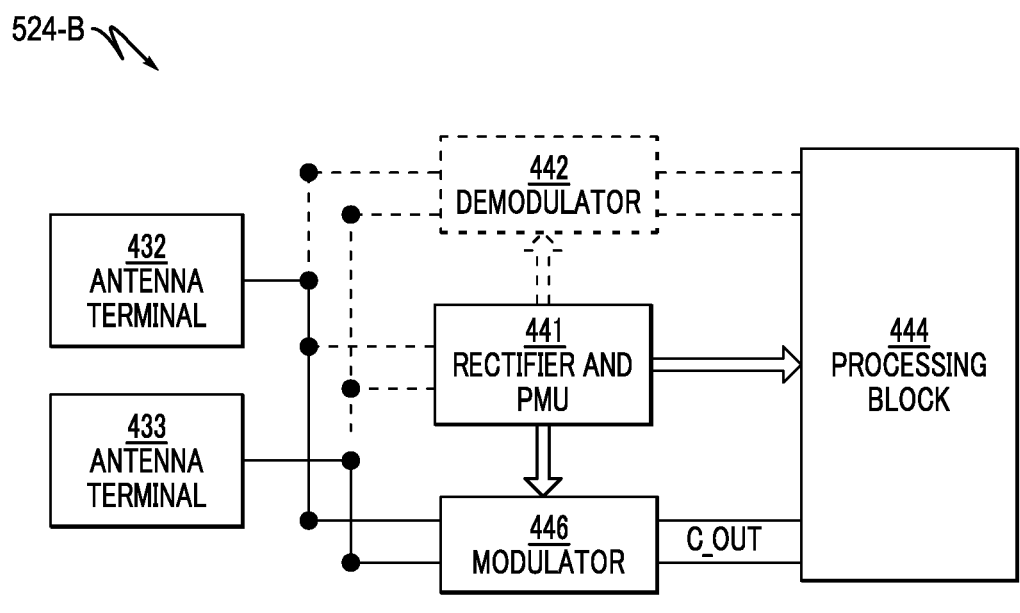

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment, C_OUT may include a transmission stream of symbols. C_OUT is then modulated by modulator 446, and output as an RF wave via antenna terminals 432, 433.

Version 524-B shows as relatively obscured those components that do not play a part in processing a signal during a T→R session. Indeed, Rectifier and PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6:
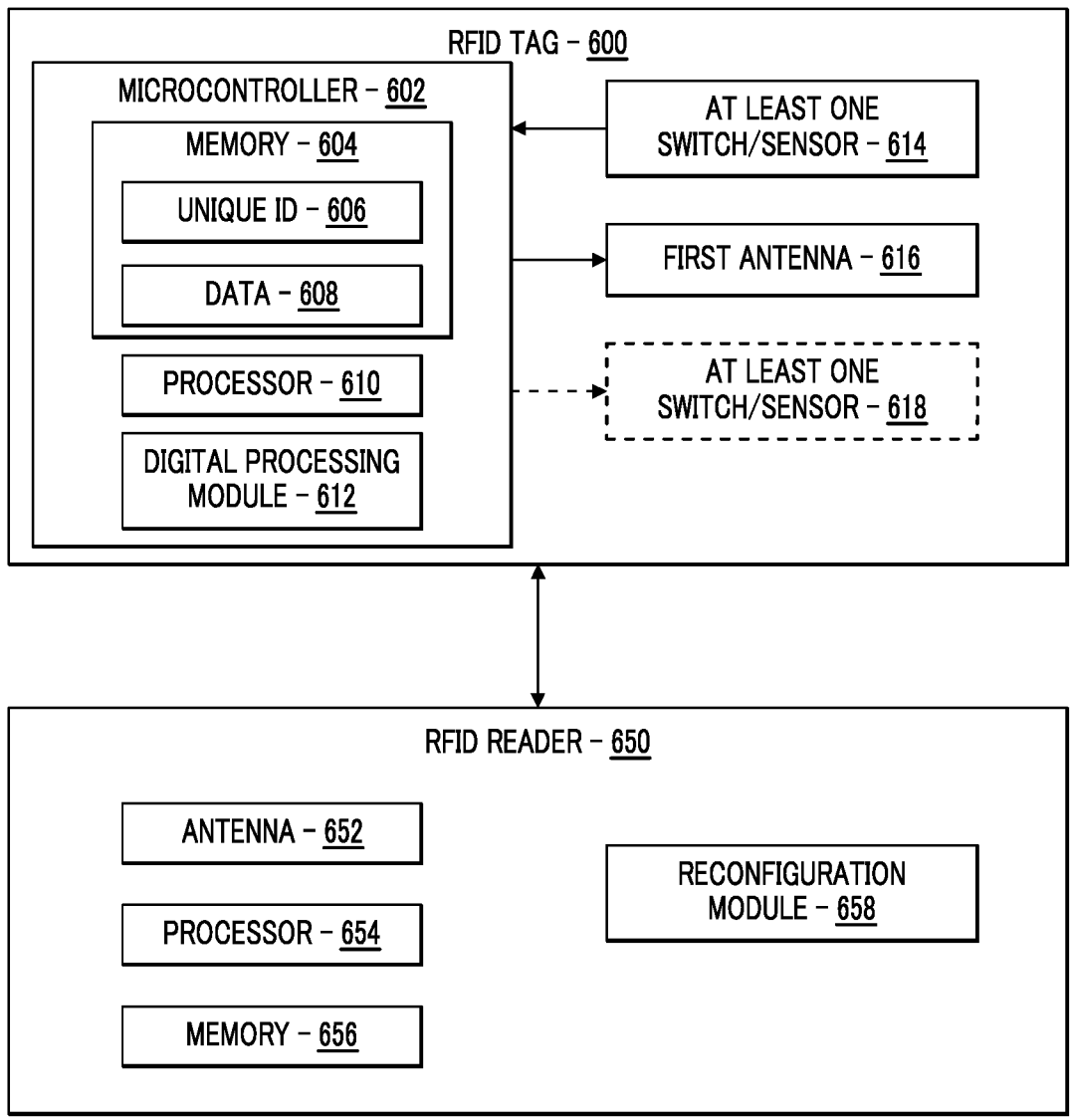
FIG. 6 is a system diagram of an RFID tag and RFID reader, according to an embodiment.

In embodiments, demodulator 442 and modulator 446 are operable to demodulate and modulate signals according to a protocol, such as Version 1.2.0 of the Class-1 Generation-2 UHF RFID Protocol for Communications at 860 MHz-960 MHz ("Gen2") by EPCglobal, Inc., which is hereby incorporated by reference. In embodiments where electrical circuit 424 includes multiple demodulators and/or multiple modulators, each may be configured to support different protocols or different sets of protocols. A protocol represents, in part, how symbols are encoded for communication, and may include a set of modulations, encodings, rates, timings, or any suitable parameters associated with data communications FIGS. 6-10 illustrate features of an RFID tag and/or RFID tag according to various embodiments. FIG. 6 illustrates a system diagram of an RFID tag and an RFID reader.

Physical electrical switch(es) or touch sensor(s) can be used as sensing devices to change the tag configuration or status or could allow the IC to internally select a different protocol or externally select a different antenna (e.g. with different frequency band or gain characteristics), as shown in FIGS. 7A-7E. The touch sensor can be capacitive based and sense different levels of capacitance (depending on the touch point), and thus provide multiple possible states. This would enable attaching a switch to fully flexible RFID tag.

As shown in FIG. 6, an RFID tag 600 may include a microcontroller 602, at least one control (e.g., at least one switch/sensor 614), a first antenna 616, and/or a second antenna 618. The microcontroller 602 may include may include a hardware processor 610 (e.g., a CPU), a digital processing module 612, and memory 604. The memory 604 may store data 608 and a unique ID 606 for the RFID tag 600 to distinguish the RFID tag 600 to other RFID tags.

The microcontroller 602 may be the IC or a part of the IC and is configured to receive a signal from the switch/sensor 614. The microcontroller 602 or IC may have several input pins to receive the signal from the switch/sensor 614 such that if the microcontroller 602 or IC receives a positive signal (e.g., a "1") in this signal the microcontroller 602 or IC may output, to the antenna 616, a first set of data from 608 and if the microcontroller 602 or IC receives the negative signal (e.g., a "0" or no signal at all) the microcontroller 602 or IC may output, to antenna 616 (and/or second antenna 618), a second set of data from data 608 that is different from first data. The positive or negative signal may be controlled by a user depressing or activating the switch/senor 604.

The output by the microcontroller 602 may also include the unique ID 606 of the RFID tag 600 so that the RFID reader 650 when receiving the output signal from the RFID tag 600 knows the output is originating from RFID tag 600.

The digital processing module 612 analyzes the signal received from the switch sensor 614 to determine if the signal is a positive or negative signal (for example), and based on such analysis, has logic to determine what data to output, protocol to use in outputting data, the particular antenna to use in outputting data, and/or any other analysis to reconfigure the RFID tag/reader.

FIGS. 7A-7E illustrate components an RFID tag may have. These figures are discussed below.

Figure 7A:
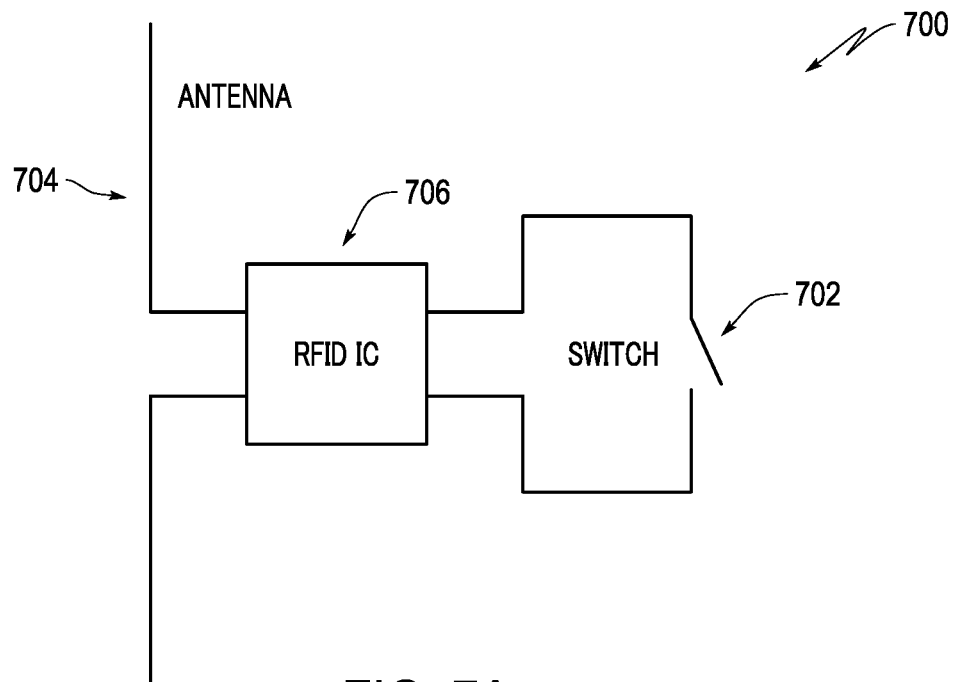
FIG. 7A is a diagram of an RFID tag having a switch, according to an embodiment.

FIG. 7A is a diagram of an RFID tag 700 having a switch 702, an antenna 704, and RFID IC 706. The RFID IC 706 may be the same as microcontroller 602 discussed above. As shown in FIG. 7A, the leads of the switch 702 is input into the RFID IC 706 such that logic (e.g. the digital processing module 612) uses the leads to determine whether switch 702 is open or closed. If the switch is closed the logic will output a positive signal (e.g., "1") or a negative signal (e.g., "0") if the switch is open. In this regard, the RFID IC 706 may control the RFID tag in a different manner based on this signal. For example, the RFID IC 706 may output different data, as discussed above, may use a different protocol, different antennas, control whether output is sent at all, or any other function which reconfigures the RFID tag. This may be based solely on the user opening or closing switch 702.

Figure 7B:
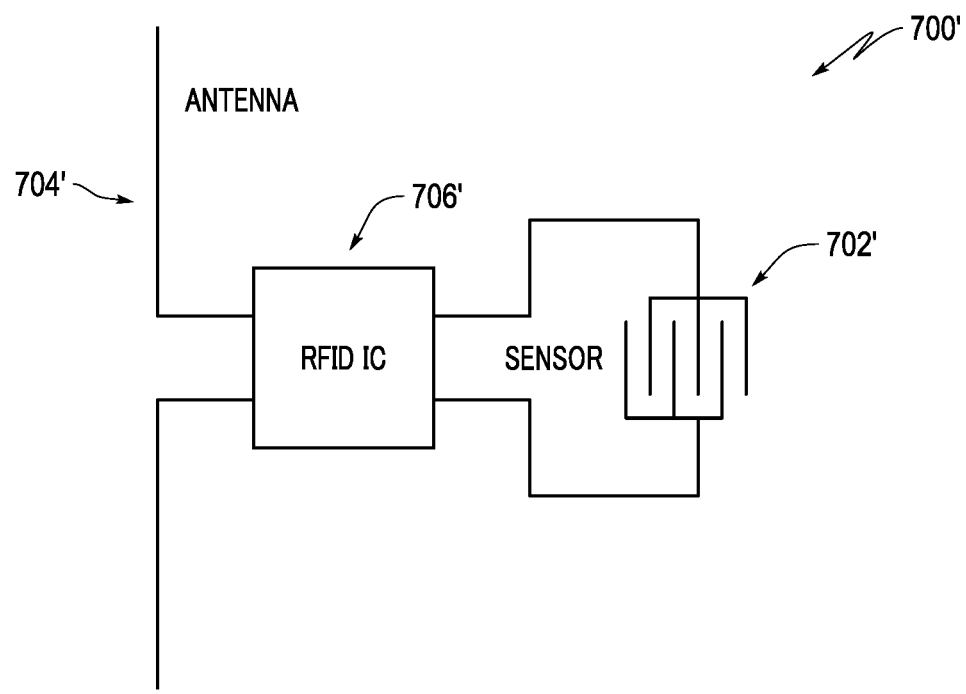
FIG. 7B is a diagram of an RFID tag having a sensor, according to an embodiment.

It should be noted that switch 702 may be any device which can invoke a change in signal at the RFID IC 706 (e.g., a signal going from "0" to "1", signal going from no signal to a signal, etc.). Indeed, the switch 702 can be replaced with any number of items. For example, switch 702 may instead be a sensor 702' as shown in FIG. 7B which illustrates an RFID tag having sensor 702' as the device for reconfiguring the RFID tag 700'.

Sensor 702' may be a capacitive touch sensor. Operation of the sensor 702' is explained in FIGS. 7D and 7E.

Figure 7C:
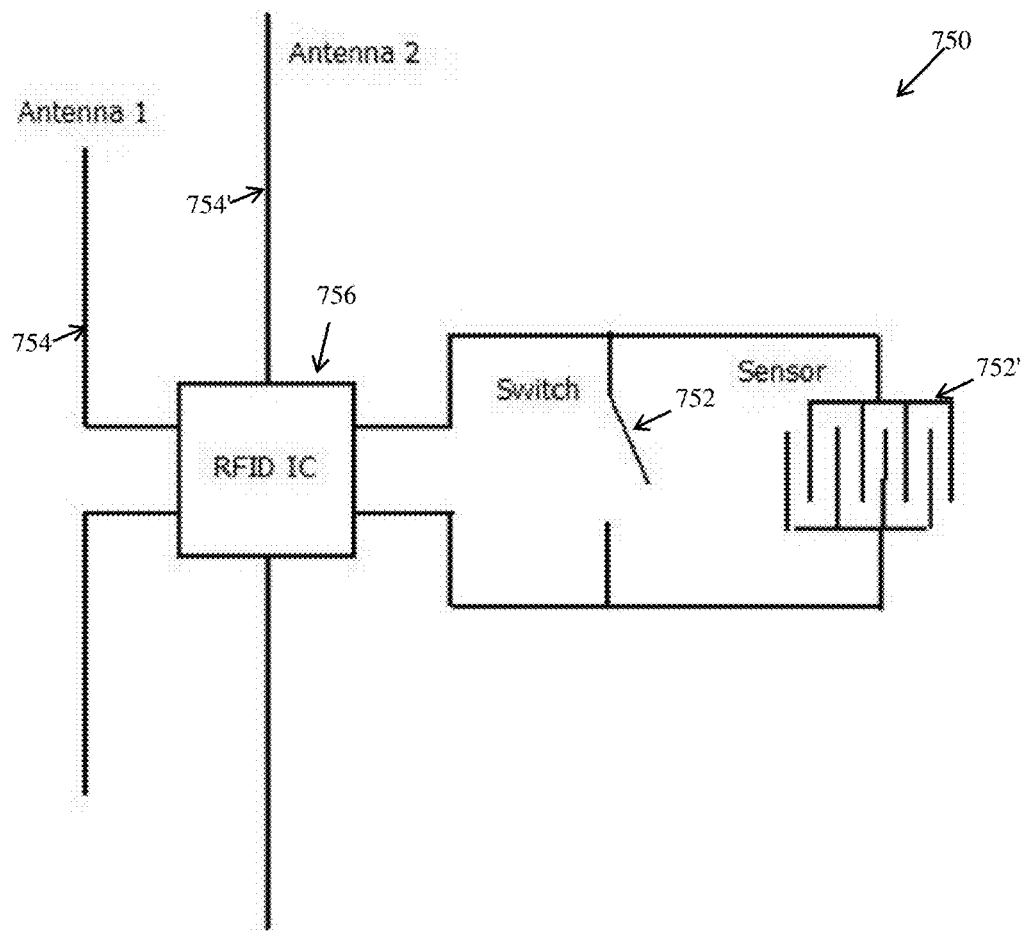
FIG. 7C is a diagram of an RFID tag having a switch and a sensor, according to an embodiment.
Figure 7D:
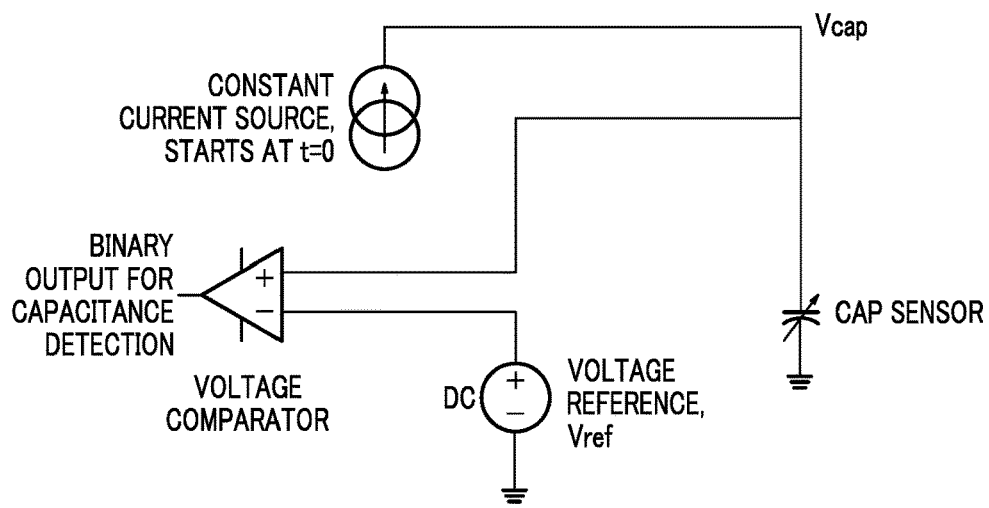
FIG. 7D is an electrical diagram of a sensor for an RFID tag, according to an embodiment.
Figure 7E:
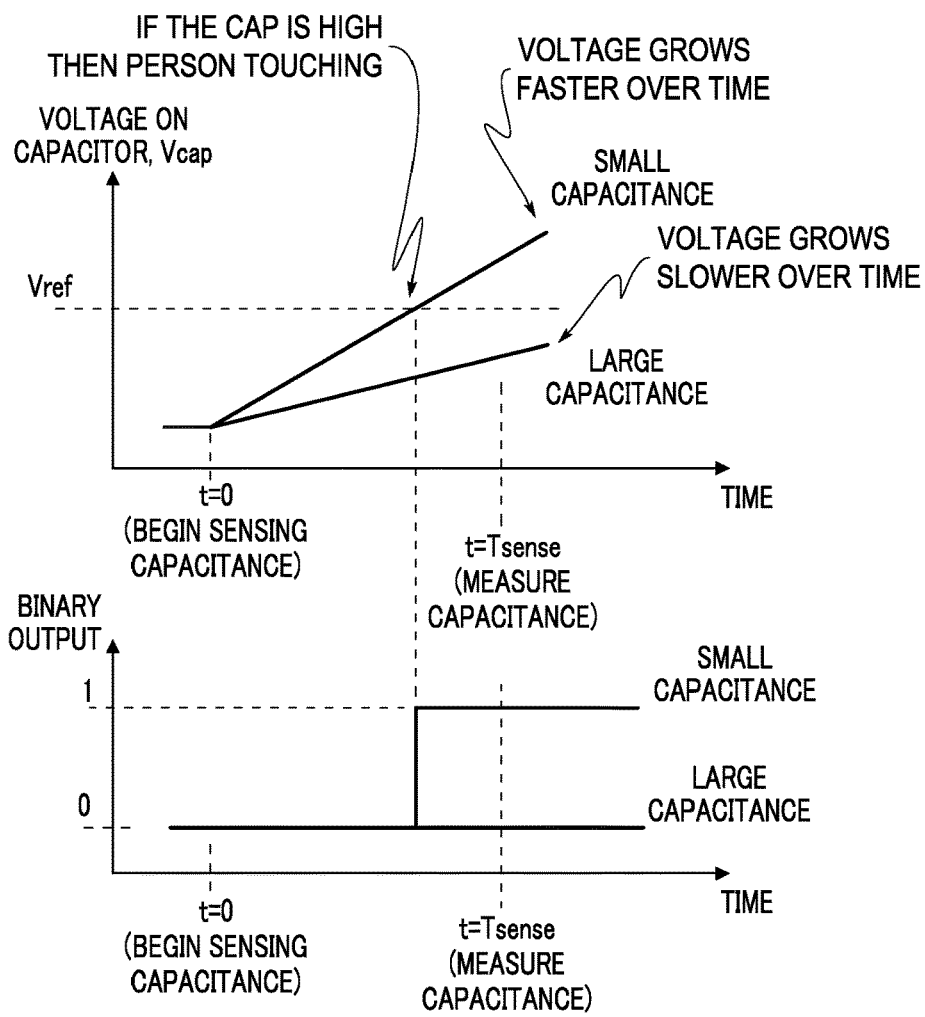
FIG. 7E are graphs showing the operation of the sensor of FIG. 7D.

Referring to FIGS. 7D and 7E, a current source and voltage comparator form a circuit for measuring capacitance and detecting capacitance value. In a previous state, the capacitor is assumed to have no charge and therefore no voltage on the capacitor, Vcap=0. At a certain time, t=0 in the example diagram, the current source applies a fixed constant current to the capacitor to create a charge on the capacitor. Over time, the voltage on the capacitor, Vcap, increases linearly with time. If the capacitance is small, the voltage will increase faster, and if the capacitance is smaller, the voltage will increase slower. The voltage on the capacitor, Vcap, is compared to a Voltage reference, Vreference, using a voltage comparator. In the example, the capacitor voltage, Vcap, is connected to the noninverting input of the comparator, and the reference voltage, Vref, is connected to the inverting input. When the noninverting input, Vcap in the example, exceeds the inverting input, Vref, the voltage output of the comparator is positive, represented as a binary one value in the example. At a pre-determined instant of time for sensing, t=Tsense in example, a digital logic circuit can sense the output of the comparator to determine of the capacitor is above or below a threshold capacitance by detecting the output of the comparator. Many factors in the circuit determine the ultimate threshold capacitance, including but not limited to, the value of the current source, the reference voltage, and the time for sensing.

Thus, the circuit in FIG. 7D determines a high signal or low signal based on whether or not there is activation of the capacitive touch sensor. The signal is output by the comparator into the microcontroller. In one embodiment, the circuit shown in FIG. 7D is part of the digital processing module 612.

Thus, as discussed above with regard to FIGS. 7A and 7B, the RFID tag reconfigures itself using a single switch/sensor that outputs a signal into the RFID IC (microcontroller), which then outputs data to a single antenna. However, it should be understood that there may be other configurations such as a combination of one or more switches and/or one or more sensors, one or more antennas, etc. For example, FIG. 7C illustrates that there can be two antennas 754, 754' along with a switch 752 and a sensor 752' placed in parallel with each other. The sensor configuration can allow for multiple inputs as the RFID IC can determine when the switch is closed or open in combination when the sensor is activated or not. For example, the RFID IC can determine if the switch is closed and the sensor is activated as a first condition, if the switch is open and the sensor is not activated as a second condition, if the switch is closed and the sensor is activated as a third condition, and if the switch is open and the sensor is not activated as a fourth condition. In this regard, the RFID IC can perform differently for each of the first through fourth conditions. For example, for the first condition, the RIFD IC can output first data through the first antenna 754 using a first protocol at a first frequency, but under the second or third condition, the RIFD IC can output second data (different from the first data) through the second antenna 754' using a second protocol (different from the first protocol) at a second frequency (different from the first frequency). In this regard, there are several modes that the RFID tag can operate in whereby the first condition is the first mode, the second condition is the second mode, the third condition is the third mode, and the fourth condition is the fourth mode.

Figure 8A:
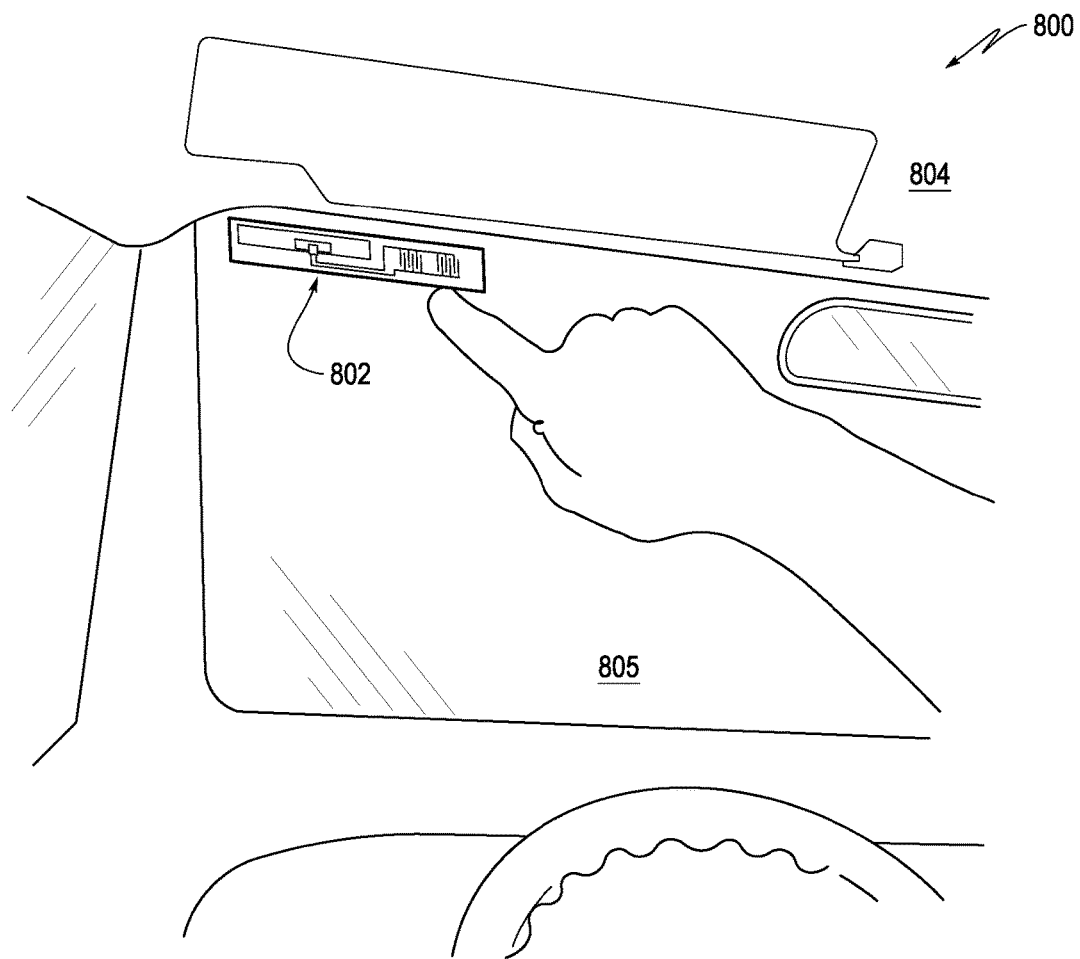
FIG. 8A is a diagram for showing the inside of a car with an RFID tag according to an embodiment.
Figure 8B:
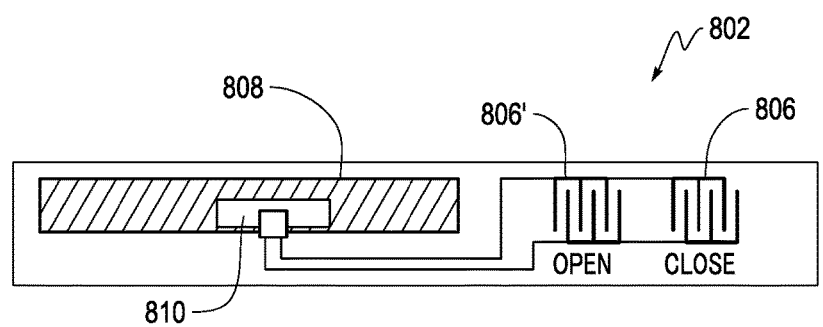
FIG. 8B is shows a diagram of the RFID tag of 8A according to an embodiment.

FIGS. 8A and 8B illustrate a reconfigurable RFID tag 802 in use as a garage door opener. As shown in FIG. 8A, the reconfigurable RFID tag 802 is disposed to be mobile in a vehicle 804 so that the user can access the reconfigurable RFID tag 802 at any time. When the user's vehicle 804 is proximate to a garage door 805 and thus the garage door opener (which includes an RFID reader), the RFID reader of the garage door opener sends an interrogation signal to the reconfigurable RFID tag 802.

The RFID tag 802 may include a configuration with two sensors. As shown in FIG. 8B, the RFID tag 802 includes an "open" sensor 806' and a "close" sensor 806. When the "open" sensor 806' is activated (e.g., by the user touching the "open" sensor 806'), the RFID tag 802 receives a signal indicating the "open" sensor 806' is activated and sends a signal with a command to open the garage door. Alternatively, when the "close" sensor 806 is activated (e.g., by the user touching the "close" sensor 806), the RFID tag 802 receives a signal indicating the "close" sensor 806 is activated and sends a signal with a command to close the garage door, whereby such "close" command may be a different command than the "open" command.

It should be understood that the RFID tag 802 may only respond to the RFID reader's interrogation signal if either the open sensor 806' or the "close" sensor 806 is activated. In this regard, the RFID tag 802 may be configured to not respond to the interrogation signal if the garage door opener RFID reader's interrogation is received but none of the switches are closed or none of sensors are activated. In one embodiment, the RFID tag 802 can have data which provides no command to the RFID reader if no switch/sensor is closed/activated.

In this regard, the RFID tag 802 may be reconfigured to output different data using a switch or sensor which is externally accessible to the user (e.g., the user can change the value of the switch or activate the sensor from the outside of the RFID tag 802).

As shown in FIG. 8B, the open and close sensors 806, 806' have leads which connect to a base portion 810 of the RFID tag. In this regard, the open and close sensors 806, 806' are separate from a housing which houses all other electrical components of the RFID tag. This allows the open and close sensors 806, 806' to be externally accessible to the user.

Figure 10:
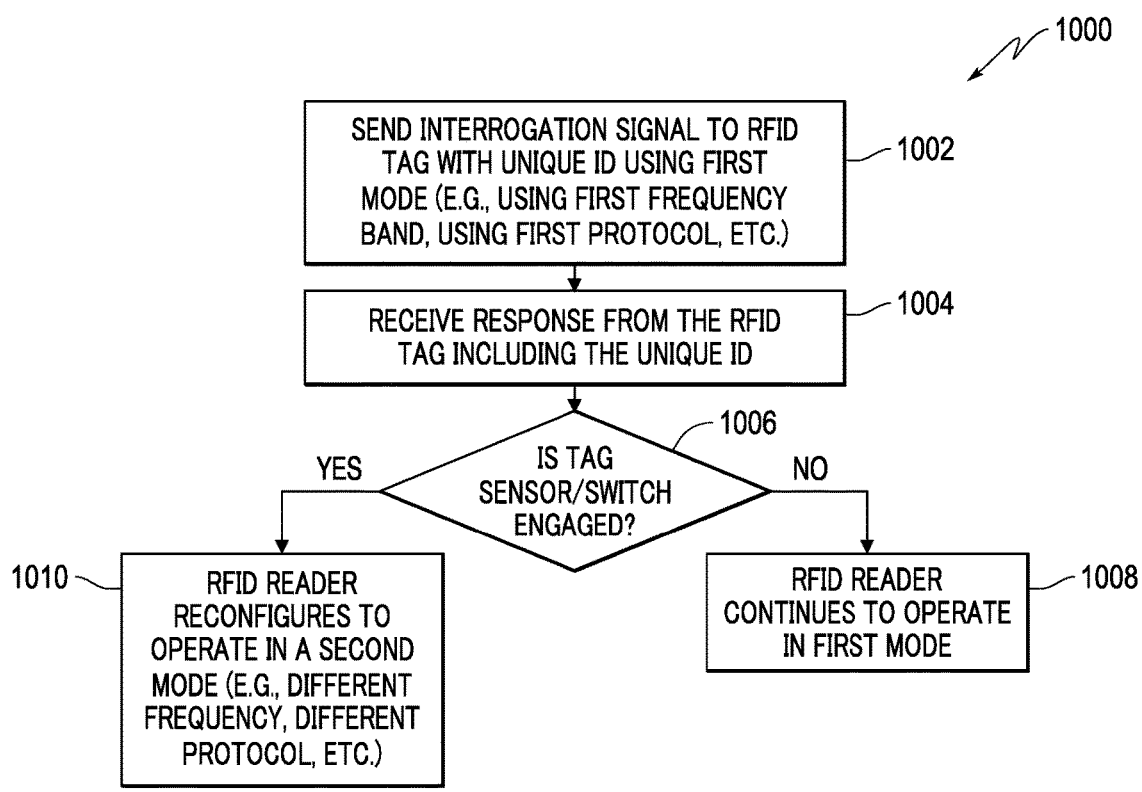
FIG. 10 illustrates a flowchart of a method of an RFID reader being reconfigured by an RFID tag response, according to an embodiment.

While FIGS. 8A and 8B illustrate one method/configuration the RFID tag can operate, there are other methods/configurations which are also possible. For example, upon touch of the switch/sensor, an RFID tag can:

- change RFID environment of the entire RFID system (for example, air protocol standard) by the user selecting the data to be sent from the RFID tag via the switches/sensors;
- change its own EPC ID (the tamper flag bit in the data of the microcontroller) to indicate different modes (for automatic vehicle identification ("AVI") tolling applications, such as carpool/solo or odd/even number of passengers);
- configure reader characteristics—a touchless configuration that now configures/changes reader parameters;

Applications of such configurable sensing tag may be any application which can utilize such reconfiguration, such as:

- A flexible windshield RFID tag (for AVI tolling) which can double as a garage door opener as shown in FIGS. 8A and 8B when the RFID tag sensor 806, 806' is touched, RFID reader installed in a garage entrance detects the RFID tag 802 (or receives open/close data) only in response to the user activating RFID tag sensor 806, 806'.
- A personnel badge that can be activated or deactivated by owner via touching it (e.g., the user activates the switch/sensor to output data but the RFID tag will not output data without such activation or only outputs unsuable data without such activation);
- A touchless reconfiguring of RFID reader system configured to perform the method as shown in FIG. 10, including touching a special tag allows one to configure reader parameters (instead of the RFID tag needing to be directly electrically connected to the device circuitry in order to change the that device parameters) (for example, the RFID system can switch between two different frequency bands (e.g. 915 and 2.4 GHz) and/or two different protocols);
- A batteryless remote control for various devices (TV, etc.) based on such tag, which is low cost and can be permanently sealed or encapsulated (does not need batteries to be ever changed because the RFID tag is passive and is powered by the RFID reader) (such feature works similar to the configurations discussed above, but there are multiple switches/sensors combined together such that each combination results in a different data output to the RFID reader which translates to different data for operating a device);
- Interactive sensors: tags can be used as actuators (reader can enable external devices, such as lights or sounds when such tags are touched).

In any or all of the above examples, the RFID tag may be passive such that the RFID reader (or another device) powers the RFID tag and an input from the user via the one or more switches/sensors reconfigures the RFID tag to output different data or change the operations of the RFID tag (e.g., output different protocol, output to a different frequency using a different antenna or the same antenna, etc.). In this regard, there is no need for a battery in the RFID tag but the RFID tag is used as a device to control other devices via differing outputs out of the RFID based on the user's control of the RFID tag via the switch(es)/sensor(s).

Figure 9A:
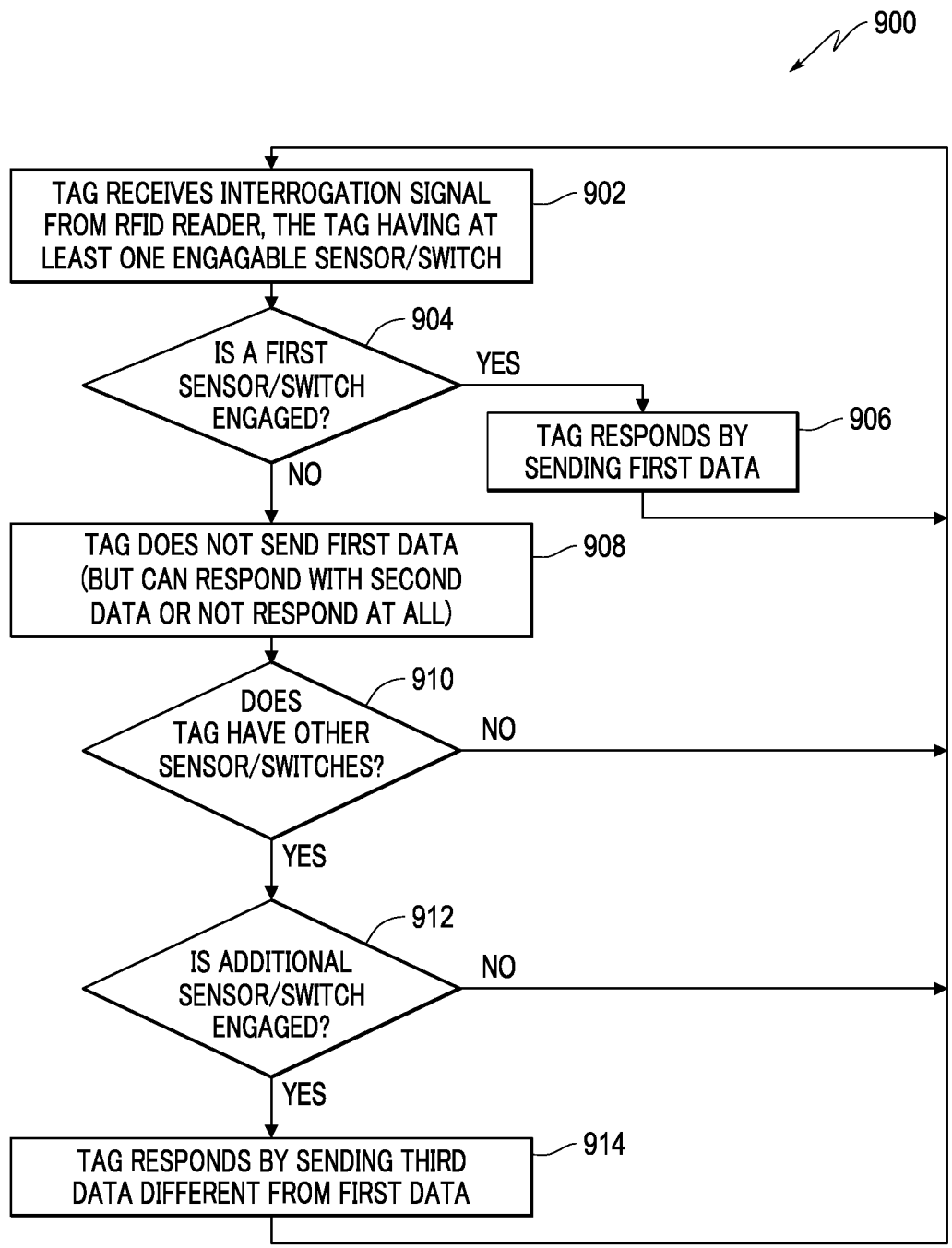
FIG. 9A illustrates a flowchart of a method of an RFID tag responding to an RFID reader, according to an embodiment.
Figure 9B:
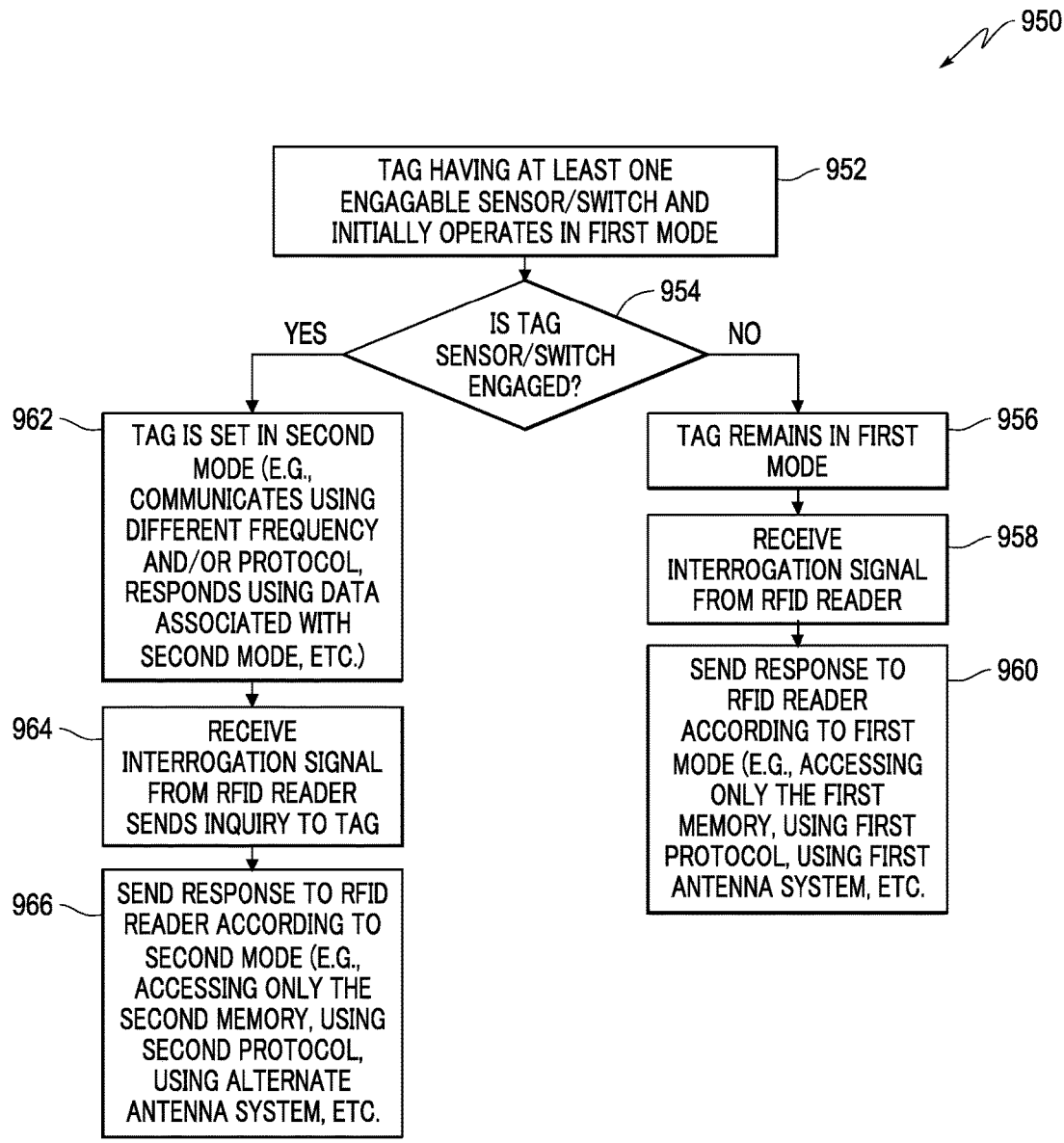
FIG. 9B illustrates a flowchart of a method of an RFID tag responding to an RFID reader, according to another embodiment.

FIGS. 9A, 9B, and 10 illustrates methods of operations in accordance with some embodiments. Starting first with the method 900 of FIG. 9A, an RFID tag (having at least one switch/sensor as discussed herein) receives an interrogation signal from an RFID reader in 902. As mentioned above, the RFID tag may or may not respond to the interrogation signal from the RFID reader if the switch/sensor is not activated/closed.

In 904, the microcontroller 602 and/or digital processing module 612 determines whether or not a first sensor/switch is engaged or activated. As mentioned above, this is determined by circuitry which detects a signal from a comparator for the sensor or by a signal from a circuit which detects whether a switch is closed. If the microcontroller 602 and/or digital processing module 612 determines that the first sensor/switch is engaged or activated, the method 900 may proceed to 906 where the tag may send first data. In this regard, the first data may only be sent if the first sensor/switch is engaged or activated.

If the first sensor/switch is determined by the microcontroller 602 and/or digital processing module 612 to not be engaged or activated, the method 900 may proceed to 908. In 908, the tag does not send the first data but instead may respond to the interrogation signal with second data which is different from the first data. Alternatively, the tag may not response at 908 at all.

In 910, if there are other sensors/switches, the microcontroller 602 and/or digital processing module 612 determines whether or not a second sensor/switch is engaged or activated. If so, RFID the tag responds by sending third data different from the first and second data.

The method 900 may return to 902 from blocks 910, 912, and 914.

FIG. 9B illustrates another method of the present application. In 952, the RFID tag having a switch/sensor operates in a first mode (e.g., sending first data, using a first protocol, using a first antenna, sending at a first frequency, etc.). Then, in 954, the microcontroller 602 and/or digital processing module 612 determines whether or not a first sensor/switch is engaged or activated. If not, the tag continues operating in the first mode in 956. In this regard, in response to an interrogation signal received from the RFID reader (step 958), the RFID tag sends a response to the RFID reader according to the first mode.

If the microcontroller 602 and/or digital processing module 612 determines that the first sensor/switch is engaged or activated in 954, the method may proceed to 962 where the RFID tag operates in a second mode (e.g., sending first data, using a first protocol, using a first antenna, sending at a first frequency, etc.), where the second mode is different than the first mode in at least one parameter (e.g., data sent, protocol used in transmitting data, antenna used for outputting, output frequency, etc.). For example, under the second mode, the microcontroller or RFID IC may respond to receiving an interrogation signal from an RFID reader by sending second data (which is only sent when the tag is in the second mode), may send data (e.g., the first data, second data, etc.) under a second frequency or using a second protocol (both of which are not used in the first mode), may send the data using a second frequency (which is different from the transmit frequency under the first mode, or any combination thereof.

In 964, the tag may receive an interrogation signal from the RFID reader and then the tag sends a response to such interrogation signal according to the second mode in 966.

FIG. 10 illustrates a method 1000 according to an RFID reader. In 1002, the RFID reader sends an interrogation signal to an RFID tag with a unique ID. The unique ID is an ID of the tag that only is associated with one particular tag such that the unique ID distinguishes the RFID tag from other RFID tags.

When an RFID tag with the unique ID receives the interrogation signal, the RFID tag then sends a response to the RFID reader. The RFID tag has a sensor/switch as discussed herein which allows the RFID tag to communicate in a mode selected by the user (e.g., a first mode, second mode, etc.)/ One of the modes of the RFID tag allows the tag to send a command to the RFID reader which, when the RFID reader receives the commend, executes the command and reconfigure the RFID reader to perform functions, change settings on the RFID reader etc.

In any event, the RFID tag response sent to the RFID reader is determined based on the sensor/switch on the RFID tag which is set or activated by the user. In this regard, the RFID tag sends a response to the RFID reader after the user activates the sensor/switch on the RFID tag and the RFID tag response is sent to the RFID reader with the RFID tag's unique ID and a command in the response if the sensor/switch on the RFID tag is engaged.

At 1004, the RFID reader receives such a response from the tag, and in 1006, the RFID reader determines whether the sensor/switch on the RFID tag was engaged or activated prior to sending the response by determining if a command is in the response. If not, the RFID reader continues to operate in first mode in 1008; otherwise, if the RFID reader determines or detects that a command is in the response or simply that the response is received by the RFID tag with the unique ID, the RFID reader reconfigures itself to operate in second mode (e.g., it changes a parameter (e.g., output frequency, changes the output antenna, changes the RFID reader protocol, etc.). The second mode is different from the first mode in that the RFID reader functions differently in the second mode than the first mode and this is only because of the response received by the RFID tag.

It is understood that implementations of antenna devices and antenna device systems according to aspects and features of the invention are applicable to numerous and different types of technologies, industries, and devices. For example, an additional implementation not specifically discussed above can include repeatedly cycling through several operational states related to a Wi-Fi access point antenna in a building, such as mounted in a corner of a room, which can be configured to automatically and periodically "scan" the room based on aspects and features of the invention to steering its high gain beam in several possible directions. In another example possible implementation, implementations of aspects and features of the invention with reconfigurable antennas in an aircraft may be especially valuable for aircraft applications due to the lack of a requirement to provide antenna devices with external power.

These and other changes can be made to the invention in light of the above Detailed Description. While the above description describes certain examples, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms.

The flowcharts and block diagrams in the Figures illustrate the architecture, functionality, and operation of possible implementations of systems and methods according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to embodiments of the invention in the form disclosed. Many modifications and variations will be apparent to those of ordinary skill in the art without departing from the scope and spirit of embodiments. The embodiment was chosen and described in order to explain the principles of embodiments and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments have other applications in other environments. This application is intended to cover any adaptations or variations of the present invention. The following claims are in no way intended to limit the scope of embodiments of the invention to the specific embodiments described herein.

What is claimed is:

1. A radio frequency identification (RFID) tag comprising:
    an antenna configured to receive a wireless signal from an RFID reader;
    an RFID circuit comprising a controller configured to process the wireless signal received from the antenna; and
    a first sensor or switch that is connected to the RFID circuit and that outputs a first signal to the RFID circuit when the first sensor or switch is engaged or activated but outputs a second signal when the first sensor or switch is not engaged or activated, wherein the controller is configured to change at least one protocol of the RFID tag when the RFID circuit receives the first signal and when the RFID circuit receives the second signal.

2. The RFID tag of claim 1, wherein the RFID tag is a passive RFID tag such that the RFID tag further comprises a power harvester configured to obtain power from the wireless signal.

3. The RFID tag of claim 1, wherein the controller is further configured to change data used for responding to the wireless signal, an output frequency, or an antenna of the RFID tag, when the controller receives the first signal or the second signal.

4. The RFID tag of claim 1, wherein the first sensor or switch is activated by a user touching the first sensor or changing a state of the switch.

5. The RFID tag of claim 1, wherein the first sensor or switch comprises a capacitive touch sensor which is activated by a user touching the capacitive touch sensor.

6. The RFID tag of claim 1, further comprising a second sensor or switch that is configured to change the protocol of the RFID tag when the second sensor or switch is activated.

7. The RFID tag of claim 6, wherein the first sensor or switch is connected in parallel to the second sensor or switch.

8. The RFID tag of claim 1, wherein the RFID tag is configured to work as a garage door opener, whereby the first sensor or switch is configured to send the first signal to the RFID circuit when the first sensor or switch is engaged or activated, wherein the garage door opener has an RFID reader transmitting an interrogation signal to the RFID tag; and
    wherein the RFID circuit is configured to transmit a command to the RFID reader in response to receipt of the interrogation signal and the first signal, wherein the garage door opens in response to a receipt of the command from the RFID tag.

9. An RFID reader comprising:
    an antenna configured to receive a response signal from an RFID tag in response to an interrogation signal received at the RFID tag, the response signal comprising a unique identification (ID) of the RFID tag and a command; and
    a circuit configured to change at least one parameter of the RFID reader in response to receiving the unique ID and the command, the circuit then outputting signal using the changed parameter.

10. The RFID reader of claim 9, wherein the command includes information related to changing of the at least one parameter of the RFID reader, and
    wherein the command is generated by the RFID tag in response to receiving a first signal from a first sensor or switch when the first switch or sensor is engaged or activated.

11. A method comprising:
    receiving, by an RFID tag, a wireless signal from an RFID reader;
    processing, by an RFID circuit in the RFID tag, the wireless signal received from an antenna;
    outputting, by a first sensor or switch in the RFID tag, a first signal to the RFID circuit when the first sensor or switch is engaged or activated;
    outputting, by the first sensor or switch in the RFID tag, a second signal to the RFID circuit when the first sensor or switch is not engaged or activated;
    changing, by the RFID circuit, a protocol of the RFID tag when the RFID circuit receives the first signal and when the RFID circuit receives the second signal,
    modifying, by a controller in the RFID circuit of the RFID tag, data to be transmitted to the RFID reader in accordance with the changed protocol; and
    transmitting, by the RFID circuit, the modified data to the RFID reader.

12. The method of claim 11, wherein the RFID tag transmits first data to the RFID reader based on the receipt of the first signal.

13. The method of claim 11, wherein the RFID tag transmits second data to the RFID reader in response to receipt of the second signal, wherein the first data is different from the second data.

14. The method of claim 11, wherein the RFID circuit is configured to transmit a command to the RFID reader in addition to the first data, wherein the RFID reader is configured to change at least one parameter associated with the RFID reader based on the received command.

* * * * *